(12) United States Patent
Kim et al.

(10) Patent No.: US 10,881,111 B1
(45) Date of Patent: Jan. 5, 2021

(54) COMPOSITION FOR PROVIDING ROOM TEMPERATURE LONG-TERM CONSTANT-CONCENTRATION CHLORINE DIOXIDE SOLUTION IN AQUEOUS MEDIUM AND PREPARATION METHOD THEREOF

(71) Applicants: NEOCL Co., Ltd., Jeollabuk-do (KR); Jung Hyuck Cho, Seoul (KR)

(72) Inventors: Yong Jun Kim, Jeollabuk-do (KR); Jung Hyuck Cho, Seoul (KR)

(73) Assignees: NEOCL Co., Ltd., Jeollabuk-do (KR); Juno Hyuck Cho, Seoul (KR)

( * ) Notice: Subject to any disclaimer, the term of this patent is extended or adjusted under 35 U.S.C. 154(b) by 0 days.

(21) Appl. No.: 16/695,470

(22) Filed: Nov. 26, 2019

(51) Int. Cl.
*A01N 59/00* (2006.01)
(52) U.S. Cl.
CPC .................................. *A01N 59/00* (2013.01)
(58) Field of Classification Search
CPC ..................................................... A01N 59/00
See application file for complete search history.

(56) References Cited

U.S. PATENT DOCUMENTS

2012/0225135 A1\* 9/2012 Krogulec ............... A01N 59/00
424/661

FOREIGN PATENT DOCUMENTS

| KR | 1020020005863 A | \* | 1/2002 |
|---|---|---|---|
| KR | 10-0364235 | | 12/2002 |
| KR | 10-0376913 | | 3/2003 |
| KR | 10-0454547 | | 11/2004 |
| KR | 10-0456483 | | 11/2004 |
| KR | 10-2005-0015949 | | 2/2005 |
| KR | 10-2006-0009355 | | 1/2006 |
| KR | 10-0575036 | | 4/2006 |
| KR | 10-0590345 | | 6/2006 |
| KR | 10-2007-0028405 | | 3/2007 |
| KR | 10-2009-0132993 | | 12/2009 |
| KR | 2009-0132993 | \* | 12/2009 |

OTHER PUBLICATIONS

Chlorine Dioxide as a Disinfectant, Lenntech (Year: 2020).\*

\* cited by examiner

*Primary Examiner* — Carlos A Azpuru

(57) ABSTRACT

The present invention provides a composition of long-term constant-concentration aqueous chlorine dioxide solution including dissolved chlorine dioxide, a decomposition inhibitor for dissolved chlorine dioxide, and a pH modifier, and a method for preparing the same.

13 Claims, No Drawings

COMPOSITION FOR PROVIDING ROOM TEMPERATURE LONG-TERM CONSTANT-CONCENTRATION CHLORINE DIOXIDE SOLUTION IN AQUEOUS MEDIUM AND PREPARATION METHOD THEREOF

BACKGROUND OF THE INVENTION

Field of the Invention

The present invention relates to a composition of room temperature long-term constant-concentration aqueous chlorine dioxide solution and a method for preparing the same.

Description of the Related Art

Chlorine dioxide was discovered in 1811 by Sir Humphrey Dary, and it is a greenish yellow-colored gas having a melting point of −59° C. and a boiling point of 11° C. Chlorine dioxide smells like light chlorine and is dissolved well in water and ethers. Since chlorine dioxide has strong oxidizing power (oxidation state: +4), it provides a sterilizing effect.

Chlorine dioxide was industrially applied to water treatment facilities of Niagara Falls (New York) in 1944 for the first time. Recently, it has been used widely as a sterilizing and disinfecting agent in USA, Europe, or the like. In Korea, chlorine dioxide is approved as a sterilizing and disinfecting agent by Ministry of Environment notification No. 1999-173 (use at 1 ppm or less), and aqueous chlorine dioxide prepared through an aqueous chlorine dioxide preparation system is used for sterilization of food by Korea Food & Drug Ministration notification No. 2007-74.

Aqueous sodium hypochlorite solution (so called 'rox') used currently and widely in households reacts with organic materials to produce carcinogenic materials, such as trihalomethane (THM) and haloacetic acids (HAAs), and other chlorinated organic compounds.

Since chlorine dioxide does not oxidize organic materials, it does not produce carcinogenic materials, such as trihalomethane (THM) and haloacetic acids (HAAs), and other chlorinated organic compounds. In addition, chlorine dioxide has a sterilization effect over a broad pH range, and is decomposed easily by light and thus is eco-friendly.

Chlorine dioxide is instable at room temperature so that it may be decomposed into $ClO_2^-$, $ClO_3^-$, $Cl^-$, or the like. For example, after analyzing high-concentration chlorine dioxide solutions furnished in three water purifying plants in Gyeonggi-do Province, most of them are materials that show significantly low disinfecting power and cause cyanosis, and the content of chlorine remaining in each solution is significantly low (Analytical Science & Tech., Vol. 12, p. 403-407, 1999).

Therefore, there is a need for a chlorine dioxide-containing composition which can retain its concentration for a long time at room temperature so that it may be stored and/or distributed for a long time.

SUMMARY OF THE INVENTION

A technical problem to be solved by the present invention is to provide a novel composition of long-term constant-concentration aqueous chlorine dioxide solution.

Another technical problem to be solved by the present invention is to provide a method for preparing a long-term constant-concentration aqueous chlorine dioxide solution.

In one general aspect, there is provided a composition of long-term constant-concentration aqueous chlorine dioxide solution, including: dissolved chlorine dioxide; a decomposition inhibitor for dissolved chlorine dioxide; and a pH modifier.

In another general aspect, there is provided a method for preparing a composition of long-term constant-concentration aqueous chlorine dioxide solution, including the steps of: preparing a first solution containing dissolved chlorine dioxide; and adding a long-term concentration-retaining agent containing a decomposition inhibitor for chlorine dioxide and a pH modifier to the first solution.

According to the embodiments of the present invention, it is possible to improve the room temperature long-term concentration-retaining ability of aqueous chlorine dioxide solution by using the long-term concentration-retaining agent containing a decomposition inhibitor for chlorine dioxide and a pH modifier.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Hereinafter, the composition of room temperature long-term constant-concentration aqueous chlorine dioxide solution according to an embodiment and a method for preparing the same will be explained in more detail.

In addition, as used herein, 'long-term concentration-retaining or stabilizing' means that the composition has a long-term concentration-retaining effect for 6 months or more, preferably 1 year or more.

Chlorine dioxide is decomposed in aqueous solution with the lapse of time. The methods for inhibiting such decomposition of chlorine dioxide according to the related art may be exemplified as follows.

In one method according to the related art, alkaline sodium chlorite ($NaClO_2$) is stored in aqueous solution, and then acid is added thereto by using an instrument or device right before use to produce chlorine dioxide according to the following Reaction Scheme 1. In the method, since sodium chlorite ($NaClO_2$) itself is substantially free from chlorine dioxide, it is not possible to expect a desired sterilizing/deodorizing effect. In addition, the instrument or device for generating chlorine dioxide is expensive. Moreover, it is not possible to control and/or retain the concentration of the generated chlorine dioxide constantly.

$$5NaClO_2 + 4HCl \rightarrow 4ClO_2 + 5NaCl + 2H_2O \quad \text{[Reaction Scheme 1]}$$

Korean Patent Laid-Open No. 2009-0132993 and Korean Patent Laid-Open No. 2007-0028405 disclose a method for preserving concentration of chlorine dioxide for about 14 days by adding an organic acid, such as formic acid or citric acid, to chlorous acid.

In addition, Korean Patent Laid-Open No. 2006-0009355 discloses a method for preserving halogen dioxide solution by removing hydroxide ions, wherein a hydroxide ion-removing agent is used so that hydroxyl ions may be present at 0.001-10% based on the total weight of a halogen dioxide precursor solution.

Further, Korean Patent Laid-Open No. 2007-0028405 discloses a method for preserving chlorine dioxide by adding citric acid in an ophthalmic composition for treatment.

However, the above-mentioned methods provide an insufficient effect of inhibiting decomposition chlorine dioxide for a long time, such as 6 months or more.

In one aspect, there is provided a composition of long-term constant-concentration aqueous chlorine dioxide solution, including: dissolved chlorine dioxide; a decomposition inhibitor for dissolved chlorine dioxide; and a pH modifier.

Since the composition of long-term constant-concentration aqueous chlorine dioxide solution includes a decomposition inhibitor for dissolved chlorine dioxide, it is possible to inhibit decomposition of chlorine dioxide and to retain the concentration of dissolved chlorine dioxide for a long time, such as 6 months or more, preferably 12 months or more.

The decomposition inhibitor for dissolved chlorine dioxide functions to inhibit decomposition of dissolved chlorine dioxide caused by forward reaction. Therefore, it is possible to retain the concentration of chlorine dioxide constantly for a long time. The decomposition inhibitor for dissolved chlorine dioxide may be a forward reaction product of chlorine dioxide.

For example, as shown in the following Reaction Scheme a, the forward reaction and the reverse reaction proceed at the same time in reversible reaction. Reactants A and B produce C and D by the forward reaction and products C and D are reduced to products A and B by the reverse reaction. Only reactants A and B are present at the initial stage of reaction so that the forward reaction may occur predominantly. However, when the amount of products C and D is increased, the reverse reaction is also enhanced. As a result, chemical equilibrium is accomplished, wherein the forward reaction and the reverse reaction proceed at the same rate.

In the chemical equilibrium state, concentrations of reactants and products are constant and undergo no change with time.

$$A+B \leftrightarrow C+D \quad \text{[Reaction Scheme a]}$$

Therefore, when adding products C and D to a composition containing A and B, chemical equilibrium is accomplished early and a decrease in concentration caused by the forward reaction of A with B is inhibited. In addition, when adding C and D to a composition containing A and B in an amount larger than the amount of C and D that can be produced by the forward reaction of A with B, A and B are increased rather due to the reverse reaction, and thus a decrease in concentration caused by side reactions, such as decomposition of A and/or B, may be inhibited for a long time.

In the composition of long-term constant-concentration aqueous chlorine dioxide solution, the initial content of the decomposition inhibitor may be 10% or more based on the initial content of dissolved chlorine dioxide. In other words, since the initial content of the decomposition inhibitor, which is the forward reaction product of chlorine dioxide, is 10% or more based on the initial content of dissolved chlorine dioxide, it is possible to prevent a decrease in concentration caused by side reactions, such as vaporization of chlorine dioxide. For example, the initial weight ratio of the dissolved chlorine dioxide to the decomposition inhibitor may be 1:0.1-10, 1:0.2-10, 1:0.5-10, 1:1-10, or 1:2-10. When dissolved chlorine dioxide and the decomposition inhibitor have the above-defined range of initial weight ratio, it is possible to further improve the stability of chlorine dioxide. The initial weight ratio is the weight ratio of the dissolved chlorine dioxide to the decomposition inhibitor upon the preparation of the composition of long-term constant-concentration aqueous chlorine dioxide solution.

In the composition of long-term constant-concentration aqueous chlorine dioxide solution, dissolved chlorine dioxide and the decomposition inhibitor are prepared separately. In other words, dissolved chlorine dioxide contained in the composition of long-term constant-concentration aqueous chlorine dioxide solution includes not only dissolved chlorine dioxide generated by adding acid to chlorite and/or hypochlorite solution but also dissolved chlorine dioxide derived from chlorine dioxide prepared separately upon the preparation of the long-term constant-concentration aqueous chlorine dioxide solution.

In the composition of long-term constant-concentration aqueous chlorine dioxide solution, the decomposition inhibitor includes chlorite and/or hypochlorite.

Chlorine dioxide reacts with water at room temperature so that it may be decomposed to produce chloric acid and chlorous acid as shown in the following Reaction Scheme 2.

$$2ClO_2 + H_2O \leftrightarrow HClO_2 + HClO_3 \quad \text{[Reaction Scheme 2]}$$

Since chlorous acid ($HClO_2$) or chloric acid ($HClO_3$) is more thermodynamically stable than chlorine dioxide ($ClO_2$), the forward reaction proceeds gradually or rapidly depending on conditions. After the lapse of a long time, chlorine dioxide is totally decomposed into chlorous acid and chloric acid.

Therefore, the composition of aqueous chlorine dioxide solution reaches chemical equilibrium by adding chlorous acid and chloric acid thereto before chlorine dioxide is decomposed. Thus, it is possible to inhibit a decrease in concentration with time caused by the forward reaction of chlorine dioxide.

Since chlorate and chlorite are added as reaction inhibitors and the pH modifier is added to retain acidic atmosphere, chlorate and chlorite are decomposed into chloric acid and chlorous acid, respectively, according to the following Reaction Scheme 3 and Reaction Scheme 4.

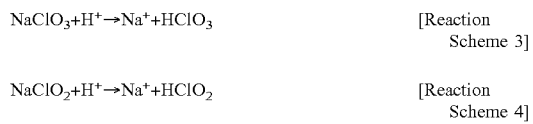

The converted chloric acid and chlorous acid inhibit decomposition of chlorine dioxide according to Reaction Scheme 2 as described above. Therefore, it is possible to retain the concentration of chlorine dioxide for a long time.

In the composition of long-term constant-concentration aqueous chlorine dioxide solution, the initial weight ratio of chlorate to chlorite may be 1:9-9:1, 2:8-8:2, 3:7-7:3, or 4:6-6:4. When chlorate and chlorite have the above-defined range of initial weight ratio, it is possible to further improve the stability of dissolved chlorine dioxide. The initial weight ratio means the weight ratio of chorate to chlorite added upon the preparation of the composition of long-term constant-concentration aqueous chlorine dioxide solution.

In the composition of long-term constant-concentration aqueous chlorine dioxide solution, the chlorate may include at least one selected from alkali metal chlorates and alkaline earth metal chlorates. For example, the chlorate may include at least one selected from sodium chlorate, potassium chlorate, lithium chlorate, calcium chlorate, magnesium chlorate and barium chlorate. Particularly, the chlorate may be sodium chlorate and/or potassium chlorate.

In the composition of long-term constant-concentration aqueous chlorine dioxide solution, the chlorite may include at least one selected from alkali metal chlorites and alkaline earth metal chlorites. For example, the chlorite may include at least one selected from sodium chlorite, potassium chlorite, lithium chlorite, calcium chlorite, magnesium chlorite and barium chlorite. Particularly, the chlorite may be sodium chlorite and/or potassium chlorite.

The composition of long-term constant-concentration aqueous chlorine dioxide solution may further include hypochlorite. When the composition further includes hypochlorite, hypochlorite reacts with chlorite and water according to the following Reaction Scheme 5 to produce chlorine dioxide additionally.

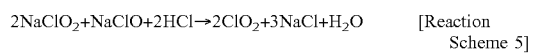

In the composition of long-term constant-concentration aqueous chlorine dioxide solution, the initial content of hypochlorite may be 2 wt % or less, 1 wt % or less, 0.5 wt % or less, 0.2 wt % or less, or 0.1 wt % or less based on the total weight of aqueous chlorine dioxide solution. When the initial content of hypochlorite is within the above-defined range, it is possible to further improve the stability of dissolved chlorine dioxide. The initial content means the content of hypochlorite added upon the preparation of the composition of long-term constant-concentration aqueous chlorine dioxide solution.

The pH modifier contained in the composition of long-term constant-concentration aqueous chlorine dioxide solution may be phosphoric acid or a salt thereof. For example, the pH modifier may be sodium dihydrogen phosphate or a mixture of sodium dihydrogen phosphate with sodium monohydrogen phosphate, but is not limited thereto, and any pH modifier capable of retaining pH of the composition constantly may be used.

The composition of long-term constant-concentration aqueous chlorine dioxide solution may have a pH ranging from 2 to 6.9 or from 2 to 6.5. When the composition of long-term constant-concentration aqueous chlorine dioxide solution has the above-defined pH range of acidic or weak acidic atmosphere, chlorate, chlorite and/or hypochlorite contained in the composition of long-term constant-concentration aqueous chlorine dioxide solution are converted into chloric acid, chlorous acid and/or hypochlorous acid so that they may be used for inhibiting the forward reaction and/or reaction for producing chlorine dioxide.

The content of dissolved chlorine dioxide contained in the composition of long-term constant-concentration aqueous chlorine dioxide solution may be 1-5000 ppm, 1-4000 ppm, 1-3000 ppm, 1-2500 ppm, or 1-2000 ppm. When the composition of long-term constant-concentration aqueous chlorine dioxide solution has the above-defined range of dissolved chlorine dioxide content, it is possible to further improve the stability of chlorine dioxide. However, the scope of the present disclosure is not limited thereto and the composition may have a higher content of dissolved chlorine dioxide depending on desired use of the composition.

For example, in the composition of long-term constant-concentration aqueous chlorine dioxide solution, the decomposition inhibitor may be sodium chlorate and sodium chlorite, and the pH modifier may be a mixture of sodium dihydrogen phosphate with sodium monohydrogen phosphate. When the composition of long-term constant-concentration aqueous chlorine dioxide solution has such a specific decomposition inhibitor and pH modifier, it is possible to further improve the stability of dissolved chlorine dioxide.

In the composition of long-term constant-concentration aqueous chlorine dioxide solution, the content of dissolved chlorine dioxide remaining in the composition after the lapse of 1 year may be 90% or more, 92% or more, 94% or more, 96% or more, or 98% or more, based on the initial dissolved chlorine dioxide content. When the composition of long-term constant-concentration aqueous chlorine dioxide solution maintains such a high concentration of chlorine dioxide even after the lapse of a long time, it may be used effectively for various applications.

The composition of long-term constant-concentration aqueous chlorine dioxide solution may be used for various applications. For example, the composition may be used for apartments, public buildings, toilets, pulp bleaching, disinfecting agents or biocides for urban and industrial water, cooling towers, swimming pools, small-scale food and beverage facilities, greenhouses, livestock, oilfield contamination solutions, oilfield treatment, fumigation, medical laboratories and facilities, or the like, but is not limited thereto. The composition may be used for any industrial field requiring sterilization and/or disinfection.

In another general aspect, there is provided a method for preparing a composition of long-term constant-concentration aqueous chlorine dioxide solution, including the steps of: preparing a first solution containing dissolved chlorine dioxide; and adding a long-term concentration-retaining agent containing a decomposition inhibitor for the chlorine dioxide and a pH modifier to the first solution.

The method for preparing the first solution containing dissolved chlorine dioxide is not particularly limited, and any method and/or apparatus for preparing chlorine dioxide known to those skilled in the art may be used.

For example, the first solution containing dissolved chlorine dioxide may be prepared by the methods described hereinafter.

First, according to one method (ultra-large-scale preparation method) for preparing chlorine dioxide in an amount of several tens of tons per day in an acidic liquid phase, chlorate as a starting material is reduced with a reducing agent, such as $SO_2$, HCl or $CH_3OH$, as shown in the following Reaction Scheme 6.

$2NaClO_3 + H_2SO_3 \rightarrow 2ClO_2 + Na_2SO_4 + H_2O$     [Reaction Scheme 6]

However, the above-mentioned method requires huge facilities, and thus has a difficulty in applying it to practical processes other than a bleaching process.

Next, according to another method for preparing chlorine dioxide in an amount of several tens of kilograms per day, chlorite is reduced with a general inorganic acid, such as HCl, $H_2SO_4$, or the like, to produce chlorine dioxide as shown in the following Reaction Scheme 1.

$5NaClO_2 + 4HCl \rightarrow 4ClO_2 + 5NaCl + 2H_2O$     [Reaction Scheme 1]

The above-mentioned method is simple but merely 80% of the reactant, chlorite, participates in the reaction to cause production of an excessive amount of impurities, resulting in low purity and yield of the resultant chlorine dioxide.

Additionally, according to still another method for preparing chlorine dioxide, chlorite and persulfate are allowed to react with each other to produce chlorine dioxide as shown in the following Reaction Scheme 7.

$2NaClO_2 + Na_2SO_4 \rightarrow 2ClO_2 + 2Na_2SO_4$     [Reaction Scheme 7]

Meanwhile, according to still another method for preparing chlorine dioxide, chlorite, hydrochloric acid and hypochlorite are allowed to react with one another to produce chlorine dioxide as shown in the following Reaction Scheme 8.

$2NaClO_2 + NaClO + 2HCl \rightarrow 2ClO_2 + 3NaCl + H_2O$     [Reaction Scheme 8]

The above-mentioned method provides high purity, but is complicated due to the introduction of three types of starting materials and requires many storage containers for materials.

Meanwhile, according to still another method for preparing chlorine dioxide, chloric acid, acid and peroxide are allowed to react with one another to produce chlorine dioxide as shown in the following Reaction Scheme 9.

$2NaClO_3 + H_2SO_4 + H_2O_2 \rightarrow 2ClO_2 + 3Na_2SO_4 + 2H_2O + O_2$     [Reaction Scheme 9]

Further, according to yet another method for preparing chlorine dioxide, chlorite (sodium chlorite) is oxidized by using chlorine to produce chlorine dioxide as shown in the following Reaction Scheme 10.

$2NaClO_2 + Cl_2 \rightarrow 2ClO_2 + 2NaCl$     [Reaction Scheme 10]

The above-mentioned method is disadvantageous in that it requires handling of toxic chlorine gas, but provides high yield and produces little byproducts.

For example, an apparatus for preparing chlorine dioxide according to Reaction Scheme 10 is disclosed in Korean Patent Publication No. 10-0376913. The apparatus for preparing chlorine dioxide includes a pH meter for monitoring pH of the reaction mixture, a chlorine dioxide outlet installed at the position symmetrical with the pH meter, a flow meter installed separately at a chlorine gas ($Cl_2$) inlet, a chlorine gas ($Cl_2$) inlet and chlorite ($NaClO_2$) inlet installed at the bottom of the reaction apparatus with bilateral symmetry, a metering pump for controlling the feed amount of chlorite ($NaClO_2$), a micro-glass fiber membrane installed in a chlorine gas ($Cl_2$) feed line, a baffle installed in perpendicular to the chlorine gas ($Cl_2$) inlet and chlorite ($NaClO_2$) inlet, and an agitator mounted to the central portion of the bottom of the reaction apparatus.

A method for preparing chlorine dioxide according to Reaction Scheme 8 is disclosed in Korean Patent Publication No. 10-0456483. The method is suitable for application in water purifying plants, and includes reacting chlorite or a mixture of chlorite with hypochlorite, chlorine gas and spray water from a high-pressure nozzle to produce chlorine dioxide, wherein chlorite is injected to the spray water before the spray water reaches a booster so that alkalinized spray water may be used as ejector spray solution.

A method for continuously preparing chlorine dioxide according to Reaction Scheme 9 is disclosed in Korean Patent Publication No. 10-059035. The method includes supplying chlorate ions, acid and hydrogen peroxide in aqueous solution to a reactor to reduce chlorate ions into chlorine dioxide in the reactor, and then mixing the resultant product with pressurized water to recover diluted aqueous solution containing chlorine dioxide from an ejector.

An apparatus for generating a trace amount of chlorine dioxide in a release-controlled manner is disclosed in Korean Patent Publication No. 10-0364235. The apparatus includes a sand layer or silica gel layer/reaction layer for preparing chlorine dioxide/coarse sand layer/silica gel layer or zeolite layer packed successively in a tube from the bottom to the top thereof; a chlorine dioxide gas emission port provided in the top layer; and a plurality of solution-absorbing ports provided at the bottom of the apparatus.

An apparatus for generating chlorine dioxide in a moment is disclosed in Korean Patent No. 10-0454547. The apparatus includes a sand layer and a reaction layer for preparing chlorine dioxide packed successively in a tube from the bottom to the top thereof; a plurality of solution-absorbing ports provided at the bottom of the tube; and a plurality of pores for emission of chlorine dioxide gas provided at the top of the tube.

An apparatus for generating chlorine dioxide by using ultrasonic waves and ultraviolet rays is disclosed in Korean Patent Publication No. 2005-0015949. The apparatus is provided with an ultrasonic vibrator to expose chlorine dioxide-producing solution to ultraviolet rays, thereby producing target chlorine dioxide.

In addition, an apparatus for generating chlorine dioxide through electrolysis is disclosed in Korean Patent Publication No. 10-0575036, wherein aqueous feed solution containing chlorite is allowed to pass through the inside of a non-membrane electrolysis cell having an anode and cathode and the vicinity of the anode, while allowing electric current to flow between the anode and cathode, in order to electrolyze the aqueous feed solution and to convert halogen dioxide salt into halogen dioxide.

For example, in the step of preparing the first solution, the first solution may be prepared by mixing chlorite, hypochlorite and inorganic acid. Particularly, the chlorite may be sodium chlorite, the hypochlorite may be sodium hypochlorite and the inorganic acid may be sulfuric acid. In this case, the first solution containing chlorine dioxide is prepared as shown in the following Reaction Scheme 11. In Reaction Scheme 11, since 1 equivalent of sodium chloride is produced, it is possible to minimize the function of decomposing chlorine dioxide by chloride ions of sodium chloride.

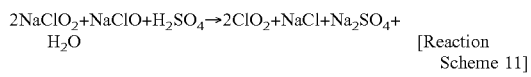
[Reaction Scheme 11]

On the contrary, when using hydrochloric acid, as shown in the following Reaction Scheme 8, 3 equivalents of sodium chloride are produced, and thus the function of decomposing chlorine dioxide by chloride ions of sodium chloride may be enhanced. As a result, it is difficult to retain the concentration of chlorine dioxide for a long time.

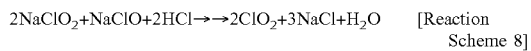
[Reaction Scheme 8]

Then, a long-term concentration-retaining agent is added to the prepared first solution. The long-term concentration-retaining agent includes a decomposition inhibitor for chlorine dioxide and a pH modifier. For example, the long-term concentration-retaining agent may further include hypochlorite.

For example, to 1 L of the first solution having a concentration of dissolved chlorine dioxide of 1.0-2,000 ppm, as a long-term concentration-retaining agent, 0.5-10 g or 1.0-5.0 g of solid-state sodium chlorate; 0.5-10 g or 1.0-5.0 g of solid-state sodium chlorite (purity 80%), or 1-40 g or 2-20 g of liquid-state sodium chlorite (aqueous solution having a concentration of 23-25%); 1.0-20.0 g or 5.0-10.0 g of aqueous sodium hypochlorite solution (10%, wt/wt); and as a pH modifier, 10-200 mL or 20-80 mL of $NaH_2PO_4$ solution having a concentration of 5-10%, or a mixed solution containing both $NaH_2PO_4$ and $Na_2HPO_4$ (1-10% $NaH_2PO_4$ and 2.5-7.5% $Na_2HPO_4$) are added so that the second solution may be prepared. Then the second solution may be agitated for 10 minutes at room temperature to prepare the composition of long-term constant-concentration aqueous chlorine dioxide solution.

Hereinafter, the present invention will be described more fully with reference to Examples and Comparative Examples. However, the following Examples are for illustrative purposes only and the scope of the present invention is not limited thereto.

Preparation of Composition of Long-Term Constant-Concentration Aqueous Chlorine Dioxide Solution Example 1

Sodium chlorite, sodium hypochlorite and hydrochloric acid were mixed to obtain aqueous chlorine dioxide solution containing 2,000 ppm of dissolved chlorine dioxide produced according to the following Reaction Scheme 8.

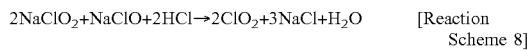
[Reaction Scheme 8]

To 1 L of the resultant 2000 ppm aqueous chlorine dioxide solution, 2 g of sodium chlorate, 2 g of sodium chlorite (purity 80%) and 10 g of aqueous sodium hypochlorite solution (10%, wt/wt) were added.

Then, 60 mL of mixed solution containing sodium dihydrogen phosphate and sodium monohydrogen phosphate (5% $NaH_2PO_4$, 5% $Na_2HPO_4$, wt/wt) was added thereto to modify pH of the aqueous solution to 2-6.5, thereby providing a composition of long-term constant-concentration aqueous chlorine dioxide solution.

Example 2

Sodium chlorite, sodium hypochlorite and hydrochloric acid were mixed to obtain aqueous chlorine dioxide solution containing 80 ppm of dissolved chlorine dioxide produced according to the above Reaction Scheme 4.

Next, 0.5 g of sodium chlorate, 0.5 g of sodium chlorite (purity 80%) and 5 g of aqueous sodium hypochlorite solution (10%, wt/wt) were added to 1 L of the resultant 80 ppm aqueous chlorine dioxide solution, thereby providing a composition of long-term constant-concentration aqueous chlorine dioxide solution.

Then, 30 mL of mixed solution containing sodium dihydrogen phosphate and sodium monohydrogen phosphate (5% $NaH_2PO_4$, 5% $Na_2HPO_4$, wt/wt) was added thereto to modify pH of the aqueous solution to 2-6.5, thereby providing a composition of long-term constant-concentration aqueous chlorine dioxide solution.

Example 3

Sodium chlorite, sodium hypochlorite and hydrochloric acid were mixed to obtain aqueous chlorine dioxide solution containing 20 ppm of dissolved chlorine dioxide produced according to the above Reaction Scheme 4.

Next, 0.1 g of sodium chlorate, 0.1 g of sodium chlorite (purity 80%) and 2 g of aqueous sodium hypochlorite solution (10%, wt/wt) were added to 1 L of the resultant 20 ppm aqueous chlorine dioxide solution, thereby providing a composition of long-term constant-concentration aqueous chlorine dioxide solution.

Then, 20 mL of mixed solution containing sodium dihydrogen phosphate and sodium monohydrogen phosphate (5% $NaH_2PO_4$, 5% $Na_2HPO_4$, wt/wt) was added thereto to modify pH of the aqueous solution to 2-6.5, thereby providing a composition of long-term constant-concentration aqueous chlorine dioxide solution.

Comparative Example 1

Comparative Example 1 is suggested in order to determine a degree of retaining concentration for a long time, when sodium chlorite and a pH modifier are used merely, while not adding sodium chlorate and sodium hypochlorite as decomposition inhibitors.

Sodium chlorite, sodium hypochlorite and hydrochloric acid were mixed to obtain aqueous chlorine dioxide solution containing 2,000 ppm of dissolved chlorine dioxide produced according to the following Reaction Scheme 8.

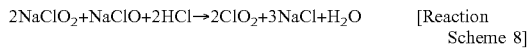
[Reaction Scheme 8]

To 1 L of the resultant 2000 ppm aqueous chlorine dioxide solution, 80 mL of sodium chlorite (25% solution) was added. Then, sodium dihydrogen phosphate (having a pH of 4.1-4.5 at 25° C. in the form of 5% aqueous solution) was added thereto to modify pH of the resultant aqueous solution to 5.5-6.0, thereby providing a composition of aqueous chlorine dioxide solution.

Test Example 1: Evaluation of Room-Temperature Stability of Dissolved Chlorine Dioxide While each composition of long-term constant-concentration aqueous chlorine dioxide solution according to Examples 1-3 and Comparative Example 1 was stored at room temperature (25° C.) for a long time, the content of chlorine dioxide contained in each composition of long-term constant-concentration aqueous chlorine dioxide solution was determined at an interval of 1 month by iodometry. The results are shown in the following Table 1.

TABLE 1

| Elapsed time | Ex. 1 | Ex. 2 | Ex. 3 | Comp. Ex. 1 |
|---|---|---|---|---|
| Start | 2000 | 80. | 20.0 | 2000 |
| 1 month | 2003 | 80.4 | 20.7 | 839 |
| 2 months | 2001 | 80.3 | 21.1 | 624 |
| 3 months | 1997 | 79.1 | 21.2 | 610 |
| 4 months | 2000 | 80.3 | 20.5 | 589 |
| 5 months | 1999 | 81.1 | 20.1 | 578 |
| 6 months | 2002 | 80.9 | 19.9 | 499 |
| 7 months | 2001 | 80.6 | 19.4 | |
| 8 months | 2000 | 79.7 | 20.2 | |
| 9 months | 2003 | 80.1 | 20.2 | |
| 10 months | 2001 | 79.9 | 20.7 | |
| 11 months | 2000 | 80.6 | 20.1 | |
| 12 months | 2003 | 80.6 | 19.9 | |
| 13 months | 2001 | 79.4 | 20.2 | |

As shown in Table 1, in each composition of long-term constant-concentration aqueous chlorine dioxide solution according to Examples 1-3, the content of chlorine dioxide remaining after 12 months is 94% or more based on the initial chlorine dioxide content. However, in the composition of composition of long-term constant-concentration aqueous chlorine dioxide solution according to Comparative Example 1, the content of chlorine dioxide remaining after 6 months is 25% or less based on the initial chlorine dioxide content.

Therefore, each composition of long-term constant-concentration aqueous chlorine dioxide solution according to Examples 1-3 shows excellent long-term storage stability at room temperature.

On the contrary, the long-term constant-concentration aqueous chlorine dioxide solution according to Comparative Example 1 shows poor long-term storage stability, since sodium chlorate and sodium hypochlorite as decomposition inhibitors are not added thereto.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A composition of long-term constant-concentration aqueous chlorine dioxide solution, comprising:
   dissolved chlorine dioxide;
   a decomposition inhibitor for dissolved chlorine dioxide; and
   a pH modifier,
   wherein the decomposition inhibitor comprises sodium chlolate, sodium chlorite and sodium hypochlorite,
   wherein the pH modifier comprises sodium dihydrogen phosphate or sodium monohydrogen phosphate,
   wherein the initial content of sodium chlolate and sodium chlorite is less 0.36 or less weight % based on the total weight of the aqueous chlorine dioxide solution, and the initial content of sodium hypochlorite is 0.1 or less weight % based on the total weight of the aqueous chlorine dioxide solution,
   wherein the concentration of the dissolved chlorine dioxide is 2000 or less ppm.

2. The composition of long-term constant-concentration aqueous chlorine dioxide solution of claim 1, wherein the dissolved chlorine dioxide and the decomposition inhibitor are prepared separately.

3. The composition of long-term constant-concentration aqueous chlorine dioxide solution of claim 1, wherein the initial weight ratio of the chlorate to the chlorite is 1:9-9:1.

4. The composition of long-term constant-concentration aqueous chlorine dioxide solution of claim 1, wherein the chlorate comprises at least one selected from alkali metal chlorates and alkaline earth metal chlorates.

5. The composition of long-term constant-concentration aqueous chlorine dioxide solution of claim 1, wherein the chlorate comprises at least one selected from sodium chlorate, potassium chlorate, lithium chlorate, calcium chlorate, magnesium chlorate and barium chlorate.

6. The composition of long-term constant-concentration aqueous chlorine dioxide solution of claim 1, wherein the chlorite comprises at least one selected from alkali metal chlorites and alkaline earth metal chlorites.

7. The composition of long-term constant-concentration aqueous chlorine dioxide solution of claim 1, wherein the chlorite comprises at least one selected from sodium chlorite, potassium chlorite, lithium chlorite, calcium chlorite, magnesium chlorite and barium chlorite.

8. The composition of long-term constant-concentration aqueous chlorine dioxide solution of claim 1, which has a pH ranging from 2 to 6.9.

9. The composition of long-term constant-concentration aqueous chlorine dioxide solution of claim 1, wherein the content of dissolved chlorine dioxide remaining after the lapse of 1 year is 90% or more based on the initial dissolved chlorine dioxide content.

10. A composition of long-term constant-concentration aqueous chlorine dioxide solution, comprising:
    dissolved chlorine dioxide; and
    a decomposition inhibitor comprises chlorate and chlorite,
    wherein the decomposition inhibitor comprises sodium chlolate, sodium chlorite and sodium hypochlorite,
    wherein the initial content of sodium chlolate and sodium chlorite is less 0.36 or less weight % based on the total weight of the aqueous chlorine dioxide solution, and the initial content of sodium hypochlorite is 0.1 or less weight % based on the total weight of the aqueous chlorine dioxide solution,
    wherein the concentration of the dissolved chlorine dioxide is 2000 or less ppm.

11. The composition of long-term constant-concentration aqueous chlorine dioxide solution of claim 10, wherein the initial weight ratio of the chlorate to the chlorite is 1:9-9:1.

12. The composition of long-term constant-concentration aqueous chlorine dioxide solution of claim 10, wherein the chlorate comprises at least one selected from alkali metal chlorates and alkaline earth metal chlorites.

13. The composition of long-term constant-concentration aqueous chlorine dioxide solution of claim 10, wherein the chlorate comprises at least one selected from sodium chlorate, potassium chlorate, lithium chlorate, calcium chlorate, magnesium chlorate and barium chlorate.

\* \* \* \* \*